US011516991B2

(12) United States Patent
Bender

(10) Patent No.: US 11,516,991 B2
(45) Date of Patent: Dec. 6, 2022

(54) KENNEL INCLUDING A COMMUNICATION SYSTEM, CLEANING SYSTEM, SANITIZING SYSTEM, BATHROOM SYSTEM, OR A COMBINATION THEREOF

(71) Applicant: Bryanna Bender, Friendswood, TX (US)

(72) Inventor: Bryanna Bender, Friendswood, TX (US)

(*) Notice: Subject to any disclaimer, the term of this patent is extended or adjusted under 35 U.S.C. 154(b) by 181 days.

(21) Appl. No.: 16/919,207

(22) Filed: Jul. 2, 2020

(65) Prior Publication Data

US 2022/0000065 A1   Jan. 6, 2022

(51) Int. Cl.
| | | |
|---|---|---|
| *A01K 1/03* | (2006.01) | |
| *A01K 5/02* | (2006.01) | |
| *A01K 7/02* | (2006.01) | |
| *A01K 29/00* | (2006.01) | |
| *B08B 13/00* | (2006.01) | |
| *A01K 1/01* | (2006.01) | |
| *A01K 1/00* | (2006.01) | |
| *A01K 1/035* | (2006.01) | |
| *B08B 3/10* | (2006.01) | |

(52) U.S. Cl.
CPC ............ *A01K 1/034* (2013.01); *A01K 1/0052* (2013.01); *A01K 1/011* (2013.01); *A01K 1/0125* (2013.01); *A01K 1/0356* (2013.01); *A01K 5/02* (2013.01); *A01K 7/02* (2013.01); *A01K 29/005* (2013.01); *B08B 3/106* (2013.01); *B08B 13/00* (2013.01)

(58) Field of Classification Search
CPC .......... A01K 1/034; A01K 1/033; A01K 1/03; A01K 1/01; A01K 1/0356

USPC ........................................ 119/51.5, 482, 500
See application file for complete search history.

(56) References Cited

U.S. PATENT DOCUMENTS

| | | | |
|---|---|---|---|
| 5,794,565 A  * | 8/1998 | Beshah | A01K 7/00 119/900 |
| 6,374,775 B1 | 4/2002 | Baumsteiger | |
| 6,568,350 B1 | 5/2003 | Savard et al. | |
| 6,854,424 B2 | 2/2005 | Bauman | |
| 6,928,958 B2 | 8/2005 | Crist et al. | |
| 8,291,866 B2 * | 10/2012 | Cauchy | A01K 1/033 119/500 |
| 8,544,418 B2 * | 10/2013 | Jiang | A01K 1/0356 119/493 |

(Continued)

FOREIGN PATENT DOCUMENTS

| | | | | | |
|---|---|---|---|---|---|
| CN | 108464249 A | * | 8/2018 | | |
| FR | 3077953 A1 | * | 8/2019 | ............. | A01K 1/033 |
| JP | 2019106971 A | * | 7/2019 | | |

*Primary Examiner* — David J Parsley
(74) *Attorney, Agent, or Firm* — Young Basile Hanlon & MacFarlane, P.C.

(57) ABSTRACT

A kennel comprising: (a) a feeding system including: (i) one or more water bowls; (ii) one or more water storage in communication with the one or more water bowls; (iii) one or more food bowls; and (iv) one or more food storage in communication with the one or more food bowls; (b) a communication system including: (i) one or more cameras; (ii) one or more speakers; (iii) one or more microphones; or (iv) a combination of (i), (ii), and (iii); (c) an entry system including: a cleaning system; and (d) a remote device including an application that is in communication with the kennel so that a user can control the feeding system, the communication system, the entry system, or a combination thereof.

20 Claims, 7 Drawing Sheets

(56) References Cited

U.S. PATENT DOCUMENTS

| | | |
|---|---|---|
| 8,915,216 B2 | 12/2014 | Hoegh et al. |
| 9,210,911 B2 * | 12/2015 | Bernal ................. A01K 1/0114 |
| 9,386,757 B1 | 7/2016 | Seeds |
| 2003/0075115 A1 * | 4/2003 | Thompson ............. A01K 1/033 |
| | | 119/482 |
| 2008/0121188 A1 * | 5/2008 | Axelrod ................. A01K 1/033 |
| | | 119/499 |
| 2011/0126775 A1 * | 6/2011 | Seltzer ................... A01K 1/033 |
| | | 119/500 |
| 2013/0068173 A1 | 3/2013 | Jamison et al. |
| 2013/0132135 A1 | 5/2013 | Galeone |
| 2016/0037744 A1 * | 2/2016 | Rudin ................... A01K 5/0107 |
| | | 119/28.5 |
| 2016/0106056 A1 * | 4/2016 | Piccioni ............... A01K 1/0047 |
| | | 119/449 |
| 2017/0027131 A1 | 2/2017 | Brownridge |
| 2019/0357495 A1 * | 11/2019 | Liu ........................ A01K 29/00 |
| 2021/0392849 A1 * | 12/2021 | Stier ...................... A01K 1/034 |

* cited by examiner

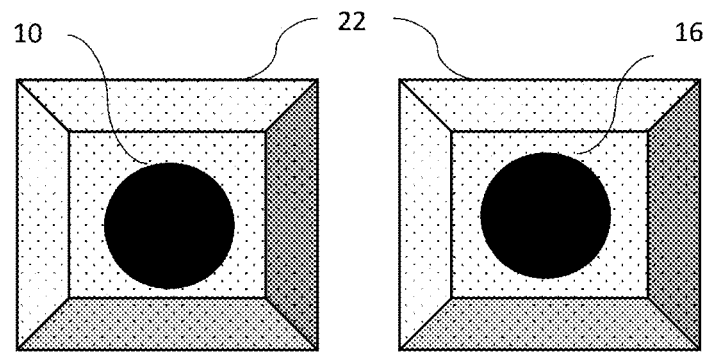
Figure 9A
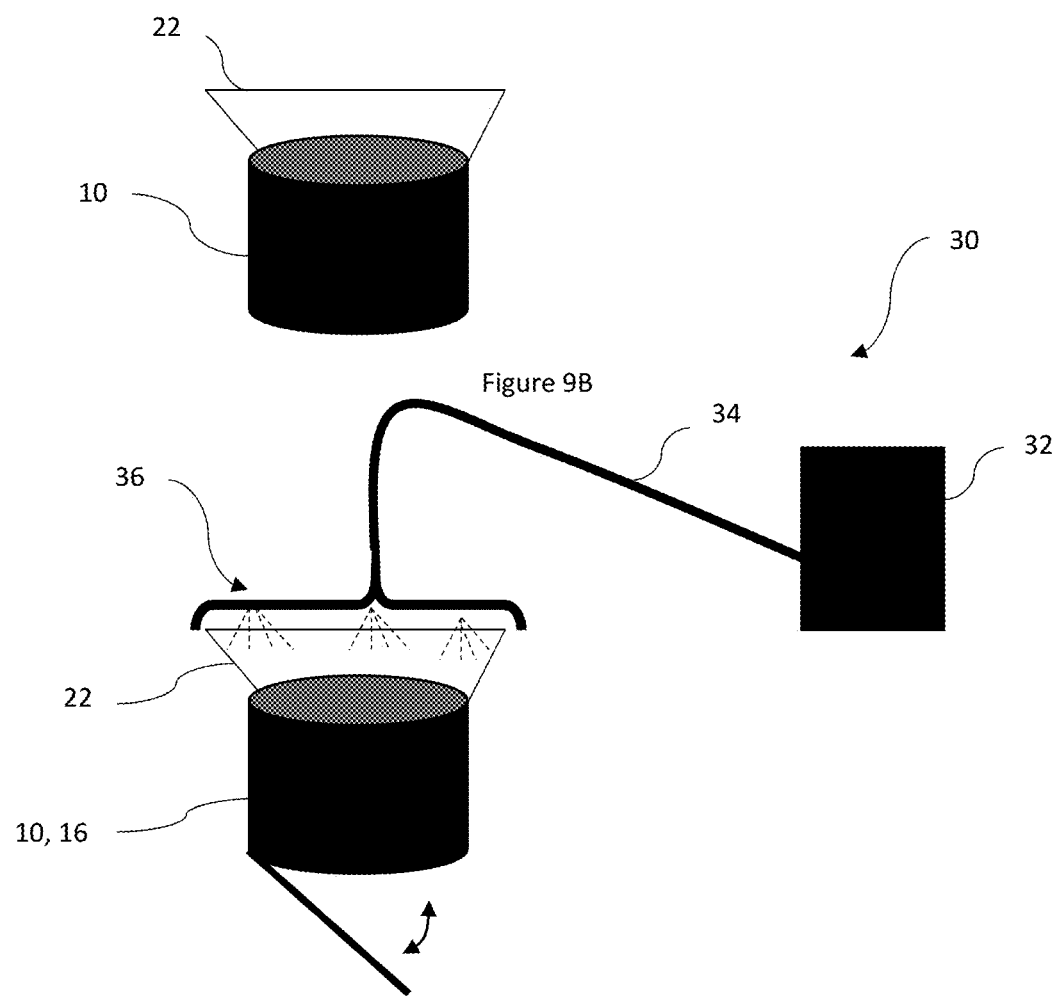
Figure 9B
Figure 9C

KENNEL INCLUDING A COMMUNICATION SYSTEM, CLEANING SYSTEM, SANITIZING SYSTEM, BATHROOM SYSTEM, OR A COMBINATION THEREOF

FIELD

The present teachings relate to a kennel for animals and especially for dogs.

BACKGROUND

Animal kennels are typically used to house animals. These kennels may be used when an owner is not home or during the nighttime. When animals are kept in the kennel for extended periods of time, the animal may need to eat, drink, or go to the bathroom.

Examples of kennels may be disclosed in U.S. Pat. Nos. 6,374,775; 6,568,350; 6,854,424; 6,928,958; 8,915,216; and 9,386,757; and US Publication Nos. 2013/0068173; 2013/0132135; 2017/0027131 all of which are expressly incorporated herein by reference for all purposes. Thus, there is a need for kennel that may be remotely controlled and monitored. It would be desirable to provide food and water to an animal remotely or adjust an amount of food being provided. There is a need for a kennel that allows one animal to enter and exit while excluding other animals. It would be desirable to have a kennel that includes a tamper sensor to alert an owner if someone is tampering with the kennel.

SUMMARY

The present teachings provide: A kennel comprising: (a) a feeding system including: (i) one or more water bowls; (ii) one or more water storage in communication with the one or more water bowls; (iii) one or more food bowls; and (iv) one or more food storage in communication with the one or more food bowls; (b) a communication system including: (i) one or more cameras; (ii) one or more speakers; (iii) one or more microphones; or (iv) a combination of (i), (ii), and (iii); (c) an entry system including: a cleaning system; and (d) a remote device including an application that is in communication with the kennel so that a user can control the feeding system, the communication system, the entry system, or a combination thereof.

The present teachings provide a kennel that may be remotely controlled and monitored. The present teachings provide an owner with the ability to provide food and water to an animal remotely or adjust an amount of food being provided. The present teachings provide a kennel that allows one animal to enter and exit while excluding other animals. The present teachings provide a kennel that includes a tamper sensor to alert an owner if someone is tampering with the kennel.

BRIEF DESCRIPTION OF THE DRAWINGS

FIG. 9A is a top view of spill prevention of a water bowl and food bowl.
FIG. 9B is a cross-sectional view of the spill prevention of the water bowl.
FIG. 9C is a plan view of a sanitizing system.

DETAILED DESCRIPTION

Figure 1:
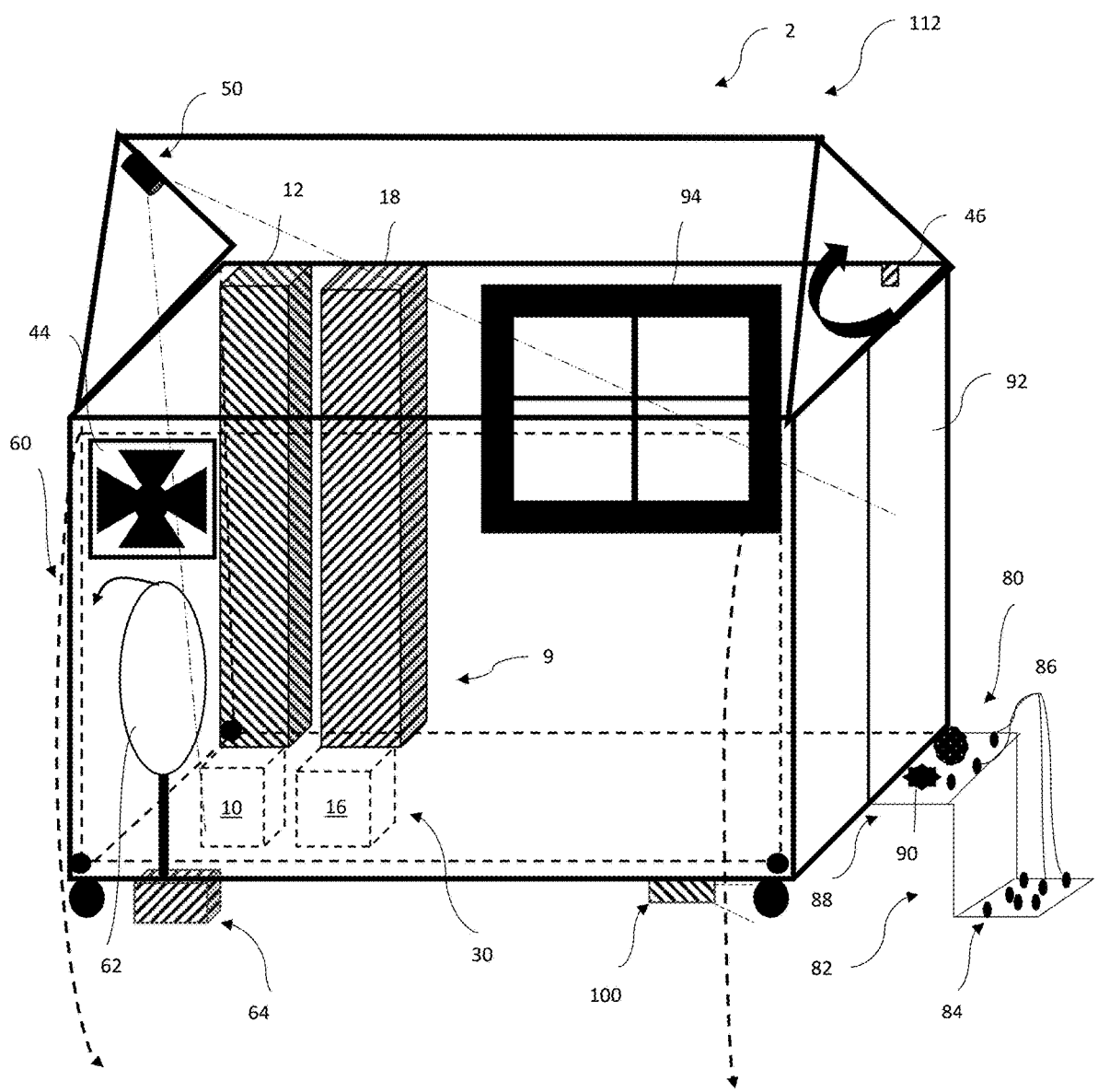
FIG. 1 is a perspective view of a kennel.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a kennel system. The kennel system includes one or more kennels. The kennel system may include a kennel including one or more modular parts that may be selectively added or subtracted from a kennel. The kennel system may include one or more kennels, two or more kennels, or three or more kennels. The kennel system may be two or more kennels connected together, modular parts connected, or both. The kennel system may be connected so that two kennels share one modular part. The kennel system may be stored, folded, compacted, or a combination thereof. The kennel system may fold flat. The kennel system may have wheels when folded. The kennel system may be pulled on wheels when folded (e.g., in a packed state). The kennel system may have a packed state, assembled state, and an unfolded state. The kennel system may be two kennels connected together or modular parts connected to a kennel.

The kennel functions to house or contain one or more animals. The kennel may function to be a closed structure that holds one or more animals. The kennel may hold a dog, cat, pig, pony, sheep, goat, cows, poultry, or a combination thereof. Preferably, the kennel holds dogs. The kennel may be square, rectangular, oval, pentagonal, octagonal, symmetrical, asymmetric, geometric, non-geometric, or a combination thereof. The kennel may be sufficiently tall to hold an animal that has a height of about 0.5 m or more, about 1 m or more, about 1.5 m or more, or even about 2 m or more. The kennel may have a width of about 0.5 m or more, about 1 m or more, about 1.5 m or more, or even about 2 m or more. The kennel may have a base, roof, and side walls. Preferably, the kennel has four sidewalls that extend between connect the roof to the base. The kennel may include or be connected to one or more remote devices.

The one or more remote devices function to communicate with an owner or user, communicate with an application (hereinafter app), control the kennel, control one or more modular parts, allow an owner to view and/or communicate with an animal, or a combination thereof. The remote device may be a phone, an app on a phone, a wired device, a wireless device, or a combination thereof. The remote device may be a dedicated device that may be used to control the kennel. The remote device may communicate with near field communications, WIFI, cellular, direct communication with a kennel, indirect communication, Bluetooth, or a combination thereof. The remote device may be handheld. The remote device may be a computer. The remote device may be a smart phone. The remote device may include memory that an app may be placed on.

The app functions to connect an owner or user to a kennel, one or more modular parts of the kennel, or both. The app may be accessed by a single remote device. The app may be on multiple devices. The app once signed into may connect an owner to one or more kennels. The app may be linked to a plurality of kennels. The app may allow a user to monitor food, water, waste, cleanliness, an animal in the kennel, if the kennel is in motion, if the kennel is being tampered with, if the animal is moving, a temperature in the kennel, speak with an animal, view an animal, turn a fan on or off, turn lights on or off, sanitize the food or water bowl, sanitize the bathroom area, open or close doors or windows, clean an entry system, activate an entry system, or a combination thereof. The app may use the speaker, microphone, camera, or a combination thereof of the remote device to use the communication system of the kennel. The app may be web based. The app may be stored on a remote device. The app may be in communication with the entry system, feeding system, bathroom system, cleaning system, connection system, modular parts, sanitizing system, communication system, or a combination thereof. The app may permit a user to communicate with the kennel as long as the kennel and the remote device are connected to a communication system (e.g., WIFI, Bluetooth, internet, cellular, near field communications). The app may connect a remote device and the kennel via one or more transmitters via indirect communication, or via direct communication. The app may directly link a remote device to the kennel. The app may connect both the kennel and the remote device to a transmitter.

The transmitter functions to provide communication between a kennel and a remote device. The transmitter may be a device in the app, in the remote device, in the kennel, a third-party device, or a combination thereof. The transmitter may use near field communications. The transmitter may be a satellite. The transmitter may allow for direct communication between a remote device and a kennel. The transmitter may allow for indirect communication where a communication is sent from a kennel or remote device to a third-party device and then to the other of kennel or a remote device. The transmitter may be in communication with a processor, micro-processor, or some other computer of the kennel. The transmitter may allow for real time transmissions between the remote device and the kennel. The transmitter may allow for the remote device to control the kennel or communicate with the kennel in real time. The transmitter may allow for communication between the remote device and the feeding system, sanitizing system, temperature sensor, light, fan, communication system, bathroom system, entry system, cleaning system, open button, door, window, movement sensor, a connection system, modular parts, or a combination thereof. For example, a user may activate the feeding system to provide food or water to an animal via a remote device and the transmitter.

The feeding system functions to provide food, water, or both to animals. The feeding system functions to monitor an amount of food or water consumed by an animal, how much food or water is remaining, if the food or water needs to be refilled, or a combination thereof. The feeding system may be a modular part that may be added or subtracted to a kennel. The feeding system may allow an owner (i.e., user) to adjust an amount of food or water provided to an animal. The feeding system may provide a predetermined amount of food or water at predetermined times. The feeding system may automatically provide food or water based on a sensed need. The feeding system may store enough food, water, or both for 1 day or more, 2 days or more, 5 days or more, 7 days or more, 2 weeks or more, or even a month or more. The feed system may hold enough food and water to feed an animal for between about 1 week and 2 weeks. The feeding system may administer an amount of food or water that is set or determined by a user. The feeding system may provide food or water based upon weight, volume, a duration of providing, or a combination thereof. The feeding system may include a screw feeder, a cup, a door, or a combination thereof that provides a predetermined or measured amount of food. The feeding system includes a water bowl and a food bowl.

The water bowl and the food bowl function to hold water and food respectively that may be consumed by an animal. The kennel may include one or more of each type of bowl. The kennel may include two or more of one bowl type and one of another bowl type (e.g., two food bowls and one water bowl). The water bowl and food bowl (e.g., bowls) function to hold contents for consumption. The bowls may continuously be filled. The bowls may be solid. The bowls may be openable and closeable. The bowls may sit on the floor of the kennel. The bowls may be recessed into the floor of the kennel. The bowls may include or be located in or proximate to one or more spill preventors. The bowls function to keep food and water separate. The bowls may separate food for separate animals that may be kept in the kennel together. The bowls may have a hinge. The bowls may self empty. The bowls may move contents from the bowl back into storage or into the bathroom system. The hinge may be movable to allow for contents to be stored so that the kennel may be moved. The hinge may drop the contents of the bowls into the bathroom system so that the bowls may be cleaned or sanitized. The hinge may cover a top of the bowl to prevent spillage during movement. The bowls may be located below a storage (e.g., water storage, food storage). The water bowl may be located below a water storage and the food bowl may be located below a food storage.

The storage functions to hold food or water that refills the bowls. The storage functions to hold an extended amount of contents that may be provided to a bowl. Each storage may fill a single bowl. One storage may fill two or more bowls. The storage may meter contents into a bowl. The storage may vertically extended along a wall. The storage may be a sealed container that holds the food and water for distribution. The storage may gravity feed the food or water. The storage may use a motor to distribute the food or water into a bowl. The storage may include a motor that meters food, water, or both into a respective bowl. The storage may include one or more refill flaps.

The refill flaps function to cover a top of a storage. The refill flaps function to move so that material (e.g., water or food) may be added and then closed so that the water or food is protected. The refill flaps may have a hinged connection. The refill flaps may be part of a roof. The refill flaps may slide to expose an open area in the storage. The refill flaps may prevent the food or water from being contaminated. The refill flaps may open when a sensor indicates that food or water needs to be added. The storage, bowls, or both may be in communication with a sensor.

A food sensor, water sensor (e.g., sensors), or both function to monitor the bowls, the storage, or both. The sensors may be located in the bowl, in the storage, or both. The sensors may monitor based upon weight, level, or both. The sensors may monitor visually. The sensors may be a proximity sensor, light sensor, ultrasonic sensor, moisture sensor, a camera and measuring device (e.g., ruler), load cell, force sensor, pressure sensor, level sensor, or a combination thereof. The sensor may be a transparent wall where the level may be monitored by looking through the transparent wall. The sensors may transmit a signal when the amount of contents in the bowl, storage, or both drop below a predetermined amount. The sensors may be the same sensor for food and water. The sensors may be different for food than water. The sensors may work with the storage to determine when a predetermined amount of contents have been applied. For example, the sensors measure as water or food is put in a bowl and once the predetermined amount of weight is applied the sensors signal to stop putting water or food into the bowl. The sensors may control a motor, a flap, a screw, an exit, or a combination thereof. The sensors may provide contents from the storage into a bowl when the sensor senses that the bowl is low or empty. The bowls may be located within or in communication with a spill preventor.

The spill preventor functions to keep the kennel clean, prevent fluids or crumbs from sitting on the floor of the kennel, collect fluid or crumbs dropped on the floor, or a combination thereof. The spill preventor may be a part of the floor of the kennel. The spill preventor may include holes, perforations, apertures, a slant, a recess, or a combination thereof. The spill preventor may replace a portion of the floor. The spill preventors may house one or more bowls. The spill preventor may collect water or food that is spilled out of the bowls. The spill preventor may guide food or water back into the bowl so that the floor is maintained to be clean. The spill preventor, the bowl, or both may be connected to the cleaning system, the bathroom system, or both so that spilled water or food may be collected and then disposed. The spill preventor may be located above a tank. The tank may be part of the bathroom system. The spill preventor may be located around the bowl or the bowl may be located within the spill preventor. The spill preventor may be cleaned or sanitized by the sanitizing system.

The sanitizing system functions to remove dirt, debris, slobber, bacterial growth, algae, mold, any other things that may create an unclean state for an animal, or a combination thereof. The sanitizing system may be in communication with the remote device, the app, or both so that an owner may remotely sanitize. The sanitizing system functions to clean and/or disinfect the feeding system, the bathroom system, bowls, storage, or a combination thereof. The sanitizing system may use bio-based cleaners, pet safe cleaners, or both. For example, the cleaner may be a pro-biotic. The sanitizing system may use only water. The sanitizing system may enclose all or a portion of the feeding system while sanitizing. The sanitizing system may include a lid that covers a bowl, spill preventor, or both while sanitizing. The sanitizing system may include a heater, nozzles, or both that act to sanitize.

The heater functions to heat water, cleaners, or both so that the feeding system, bathroom system, or both are sanitized. The heater may produce boiling water, steam, or both. The heater may heat the water to a high enough temperature to kill some or all of growth or microbes in the bathroom system, feeding system, or both. The heater may heat water to about 50° C. or more, about 75° C. or more, about 90° C. or more, about 95° C. or more, about 100° C. or more, or about 125° C. or less. The heater may use electricity to heat the water. The heater may be connected to the water storage and heat water on demand from the water storage. The heater may include a tank that stores water (heated or unheated). The heater may be a tankless water heater (e.g., does not store hot water). The heater may pressurize the water as the water is heated. The heater may include a pump. The heater or a pump in the sanitizing system may pressurize water to a pressure of about 1 MPa or more, about 3 MPa or more, about 5 MPa or more, about 10 MPa or more, about 15 MPa or more, about 20 MPa or more, or about 50 MPa or less. The heater may heat and move water from a storage location to a supply line when the sanitizing system is activated.

The supply lines function to transfer water, cleaner, or both from the heater, a pump, storage tank, or a combination thereof to a location to be cleaned. The supply lines may be made of or include one or more of rubber, a polymer, a natural material, a synthetic material, metal, a metalized material. The supply lines may be flexible. The supply lines may be movable. The supply lines may support a lid. The supply lines may raise and lower the lid or be used to raise and lower the lid. The supply lined may be wound into a spool. The supply lines may be wound up manually or atomically. The supply lines may provide heated water or cleaners to a predetermined location. The supply lines may retract into a stored state that is out of the kennel. The supply lines may direct a portion of the sanitizing system to a predetermined location upon activation of the sanitizing system. The supply lines may supply water from the heater, pump, storage tank, or a combination thereof to nozzles, the lid, or both.

The nozzles function to distribute water, steam, cleaner, or a combination thereof. The nozzles function to pressurize the water, spread the water, direct water across a region to be cleaned, or a combination thereof. The nozzles may include a venturi that pressurizes the water, cleaner, or both. The nozzles may be spaced apart so that the entire bowl, bathroom system, spill preventor, or a combination thereof are contacted by the fluid, cleaner, or both. The nozzles may provide water at a sufficient temperature or pressure that particles stuck on are removed. The nozzles may located within the kennel proximate to a light senor or spaced apart from a light senor so that the cleanliness may be visually inspected.

The light sensor functions to monitor an amount of light within the kennel. The light sensor may determine if lights need to be turned on or off. The light sensor may send an indication to an owner that the lights need to be turned on. The light sensor may trigger the lights to turn on and then to turn off the lights after a predetermined amount of time. The light sensor may be a photoresistor, photodiode, phototransistor, or a combination thereof. The light sensor may be located in the roof, on a side wall, floor, proximate to a light, or a combination thereof.

The one or more lights function to illuminate all or a portion of the kennel. The lights may provide direct light, indirect light, or both. The light provided may vary depending on the time of day. For example, day light light may be provided during the day if it is a dark day and indirect light may be provided at nighttime. The light may be a projector. The projector may project light onto a roof of the kennel. The projector may project symbols, words, images, or a combination thereof onto a roof, wall, or floor of the kennel. The projector may project stars, rainbows, fish, an ocean scene, birds, an outdoor scene, or a combination thereof. The images projected may be selectable or changeable. The light may move around the kennel. The light may change in color. The light may be aimed by the app or remote device. The light may be moved around an inside of the kennel. The light may be located in a corner of the kennel.

The kennel may include a fan. The fan functions to circulate air. The fan functions to remove air or heat from the kennel. The kennel may provide heat into the kennel if the kennel is cold. The fan may circulate air around the interior of the kennel. The one or more fans may be located in a side wall, the roof, or both. The fans may be a portion of a wall. The one or more fans may be controlled by a user, an app, a temperature sensor, or a combination thereof.

The temperature sensor functions to monitor a temperature inside of a kennel. The temperature sensor may monitor a temperature inside of a kennel, outside of the kennel, or both. The temperature sensor may control a fan. The temperature sensor may alert a user if a temperature inside of the kennel becomes too high. The temperature sensor may turn on or off a heater, an air-conditioner, or both. The temperature sensor may be part of a temperature system that controls the temperature of the kennel.

A communication system may be located within or connected to a kennel. The communication system functions to provide communication between an owner (or user) and an animal within the kennel. The communication system may be a modular part that may be added to a kennel. The communication system may allow an owner to monitor a status of an animal, view an animal, listen to sounds of the animal, provide images to an animal, or a combination thereof. The communication system may be located on a track and may move up and down, side to side, or both. The communication system be fixed. The communication system (modular part) may include cameras, speakers, microphones, screens, or a combination thereof.

The camera functions to allow an owner to see an animal within the kennel. The kennel may include a single camera. The kennel may include one or more cameras, two or more cameras, or even three or more cameras. The camera may be connected to a sidewall, roof, floor, or a combination thereof. The camera may be fixed. The camera may be movable, zoomable, or both. The camera may live stream continuously. The camera may record. The camera may be free of recording. The camera may be controlled by the app, the remote device, or both. The camera may be a digital camera. The camera may include infrared. The camera may be 4K. The camera may have a lens that is about 90 degrees or more, about 100 degrees or more, about 110 degrees or more, or about 180 degrees or less. The camera may be connected to the entry system. The camera may be part of a biometric sensor or a face recognition sensor. The camera may include or be connected to one or more speakers.

The speakers may function to allow a user to communicate with an animal within the kennel or proximate to the kennel. The speakers may play music. The speakers may allow a user to talk through the app, the remote device, or both with an animal. The speakers may permit an owner to talk to an animal while viewing the animal. The speakers may be part of a camera, microphone, screen, or a combination thereof. The speakers may be sufficiently loud that the animal may hear the user speaking. The speaker may be used in conjunction with a microphone so that there may be two-way communication.

The microphone may function to pick up and transmit sound from an animal so that an owner can hear sounds of the animal. The microphone may alert a user when sounds are made over a certain decibel. The microphone may be located at a height of the animal so that the sounds of the animal are picked up. The microphone may located in or proximate to the camera, screen, speakers, or a combination thereof. The microphone may be movable if sounds from the animal are muffled. The microphone may be fixed. More than one microphone may be located in one or more locations of the kennel. For example, microphones may be located on opposing walls of the kennel. The microphones may mute barking. The microphone may be located near a screen.

The screen functions to provide an image to an animal within the kennel. The screen may allow the animal to see its owner or other person. The screen may allow for two way visual communication. The screen may be sufficiently large that the animal may see items on the screen. The screen may be 5 cm×5 cm or larger, 10 cm×10 cm or larger, 15 cm×15 cm or larger, or about 25 cm×25 cm or less. The screen may be located towards a top of the kennel. The screen may located eye level to an animal when the animal is standing, sitting, laying, or a combination thereof. The screen (communication system) may be movable to adjust to a height of an animal. The communication system may be used to monitor the cleaning system, the bathroom system, or both.

The bathroom system functions to allow an animal to go to the bathroom while maintaining cleanliness of an area of the kennel. The bathroom system may permit an animal to stay within the kennel for an extended period of time. The bathroom system may store waste. The bathroom system may extend the kennel to create a bathroom area. The bathroom system may be movable up and down between a stored state or position and a deployed state or position. The bathroom system may store fluid, solids, or both. The bathroom system may include a tray that collects waste and guides the waste to a storage location.

The functions to collect and transport fluid, solids, or both. The tray may be solid. The tray may be sloped to guide waste (e.g., solids and/or liquids) to a storage location. The tray may include holes or apertures that allow solids to pass into a storage. The tray may extend cantilever from the kennel. The tray may be supported by legs. The tray may be supported by wires or ropes that extend from the kennel to the tray. The tray may include netting or walls that expand to extend the kennel to include the bathroom system. The tray may be automatically folded up by a motor pulling on a rope or cable. The tray may include a coating that prevents waste from sticking to the tray. The tray may include a polytetrafluoroethylene coating, an anodized coating, or both. The try may be filled with or include litter, wood shavings, substances that absorb fluid, or a combination thereof. The litter, wood shavings, substance that absorb fluid, or a combination thereof may be moved into the storage or may be removed. The tray may be located above the storage. The tray may support an animal while directing waste into a storage.

The storage may be fluid storage, solid storage, or both. The storage functions to collect and store waste. The storage functions to be removable so that the storage may be cleaned and the waste discarded. The storage may assist in trapping smell. The storage may separate liquids and solid. The storage may be located below the tray. The storage may fold up with the tray. The storage may be located under the kennel. The storage may be located at or near a hinged location so that the storage does not move when the tray is folded up. The storage may taper towards a collection region where the waste is stored. The storage may be filled with litter, wood shavings, substances that absorb fluid, or a combination thereof. The storage may include one or more sensors (e.g., bathroom sensor).

The sensor may function to monitor an amount (e.g., level) of waste (or if any waste is present) and signal to an owner if the sensor needs to be changed. The sensor may detect based on mass, duration the waste is contained in the storage, if the storage is full, or a combination thereof. The bathroom sensor may be in communication with and provide an indication to an app or remote device that the bathroom system has been used. The sensor may be a load cell, use ultrasound, or both. The bathroom system may be located on an opposite side of the kennel as an entry system.

The entry system may function to assist an animal in entering and exiting the kennel. The entry system may function to prevent some animals from entering and exiting the kennel. The entry system may clean an animal's paws as the animal enters and exits the kennel. The entry system may be a modular part. The entry system may be retractable, extendable, or both. The entry system may include stairs or a ramp. The stairs or a ramp may fold up.

The stairs or ramp may be attached to the kennel. The stairs or ramp may function to assist an animal in entering or exiting the kennel. The stairs or ramp may assist an animal in walking to a raised position. The stairs or ramp may include a cleaning system, an open button, a biometric sensor, or a combination thereof.

The cleaning system functions to prevent or reduce fluids, food, debris, litter, bedding or a combination thereof from being carried out of the kennel, carried out on an animal's paws, or both. The cleaning system may include a recess that holds fluids, food, debris, litter, bedding, or a combination thereof that are removed from paws. The cleaning system may include bristles, brushes, carpet, fibers, or a combination thereof.

The brushes function to contact paws of an animal and knock fluids, food, debris, litter, bedding or a combination thereof off of paws so that they are collected on the ramp or stairs. The cleaning system may be a plurality of brushes. The brushes may extend from a sidewall, a bottom, or both. The brushes may have bristles that are sufficiently rigid that the bristles resist movement of the paws and brush off items as the bristles move back into a steady state. The brushes may be groups of bristles that extend substantially a length of the stairs or ramp. The brushes may be static. The brushes may be motorized and may move. The brushes may be dry. The brushes may apply a fluid. The brushes may be on every step or an entire length of a ramp. The brushes may only be located proximate to the door of the kennel. The brushes may be located proximate to or include an open button.

The open button may function to allow an animal to enter or exit the kennel. The open button may allow only predetermined animals to enter or exit the kennel. The open button may sense a paw or nose of an animal. The open button may only allow a predetermined animal to activate a door. The open button may be connected to recognition software, facial recognition, paw recognition, a biometric sensor, a RFID sensor, or a combination thereof.

The biometric sensor functions to permit a predetermined animal to enter or exit the kennel. The biometric sensor may sense based on a unique paw print when the animal steps on the biometric sensor. The biometric sensor may include a camera that recognizes a specific animal, face of an animal, or both. The biometric sensor may be connected to the communication system. The biometric sensor may use the communication system to determine which animal is trying to enter the kennel. The biometric sensor may be a sensor that communicates with a RFID sensor. The RFID sensor or tag may be placed on each animal (e.g., a collar) and when the animal is proximate to the biometric sensor the door may open when the RFID sensor is within a proximity so that only that animal may enter. The biometric sensor may be keyed to one specific animal. The biometric sensor may prevent food stealing by only letting in a predetermined animal. The biometric sensor may allow certain animals to come and go during times determined by an owner. The biometric sensor may control motion of the door.

The door functions to allow an animal to enter or exit the kennel. The door may slide open and slide closed. The door may include the biometric sensor so that the animal has to touch or come proximate to the biometric sensor to open the door. The door may be solid. The door may be a clear panel. The door may be transparent. The door may include metal mesh. The door may allow animals to look out into a room or area the kennel is located. The door may include a sunshade. A sunshade may be a second door that is independently movable relative to a first door. The door may slide behind, in front of, into, or a combination thereof a wall for storage. The door may include a window or be located adjacent a window.

The window functions to allow light to enter, circulate air, or both. The window may open and close. The window may be permanently closed. Windows may be located in one or more side walls, the roof, or both. The windows may be remotely opened. The windows, door, or both may include or be made of a transparent material. The windows may provide a view of the bowls, the fan, storage, or a combination thereof. The windows, doors, or both when they are made of a transparent material may include a photochromic dye that is adjusts in tint when exposed to sunlight. The photochromic dye may darken the kennel while allowing some light to enter. The photochromic dye may block ultraviolet light, heat, a greenhouse effect, or a combination thereof. The windows open while preventing an animal from exiting the kennel. The windows may be used in conjunction with a sensor (e.g., light sensor). Motion of the windows or doors may monitored by a movement sensor.

A movement sensor may function to detect motion of an animal, the kennel, window, door, or a combination thereof. The movement sensor may alert an owner if the kennel is in motion, being disturbed, or both. The movement sensor may sound an alarm, a silent alarm, or both. The movement sensor may include GPS. The movement sensor may monitor rotation of the wheels. The movement sensor may monitor movement of the kennel from a placed location. The movement sensor may detect shaking of the cage. The movement sensor may sense an unauthorized opening of a door, a window, or both. The movement sensor may communicate with the remote device, the app, or both. Upon a sensed movement or unauthorized movement the movement sensor may alert the owner, alert the remote device, alert the app, sound an alarm with the communication system, or a combination thereof. The movement sensor may be part of the communication system. The movement sensor may be a discrete part. The movement sensor may be used when the kennel is in the packaged state, assembled state, unfolded state, or a combination thereof. The movement sensor may be automatically activated when the kennel is in an assembled state.

The kennel may be placed in a packaged state for transportation. The packaged state may be where the roof, side walls, or both are lowered onto a floor, folded on a floor, detached from the floor and/or roof, or a combination thereof. The packaged state may be where the walls and roof are stacked in a flat configuration. The packaged may have the modular parts removed. The packaged state may rest the floor, roof, side walls, or a combination thereof on the wheels. In the packaged state the kennel may be pulled into placement and then all or a portion of the kennel and/or modular parts moved to unfolded state and/or an assembled state.

The assembled state functions to be a state where the kennel is ready for use. In the assembled state the kennel's walls and roof are attached in a state where an animal may be placed in the kennel. The kennel when in the assembled state may form its geometric shape (e.g., square, rectangular). In the assembled state the kennel may be connected to a power source. The power source may be a plug, a battery, solar power, wind power, green energy, or a combination thereof. In the assembled state one or more modular parts may be attached to the kennel. In the assembled state the wheels may be locked. In the assembled state the wheels may be movable. When the kennel is in an assembled state the modular parts may be a folded or unfolded state.

The unfolded state may be a state where the kennel, the modular parts, or both are unpackaged but not necessarily connected together or assembled. Preferably, in the unfolded state the parts are connected together and fully deployed. For example, in the unfolded state the entry system may be connected and the stairs or ramp unfolded so that an animal may use the entry system (e.g., in comparison to where the entry system is connected and the stairs or ramp remain folded). In the unfolded state the modular parts, the kennel, or both may be connected and may be ready to receive an animal (e.g., versus a folded state where they may not be ready to receive an animal or to be used). In the unfolded state the wheels may be locked or removed from contact with a surface so that the kennel may be immobilized.

The wheels function to assist in movement of the kennel. The wheels may assist in movement in the packaged state, the assembled state, the folded state, or a combination thereof. The wheels may be located in two locations or more, three locations or more, or four locations or more. The wheels may be located at one end. The wheels may be located at both ends. One end may include wheels and one end may include supports to keep the kennel level when at rest. The wheels may be caster wheels. The wheels may rotate 360 degrees. The wheels may be free of rotation about a pivot during movement. The wheels may be movable up and down away from and towards a surface. The wheels may be movable relative to a floor or base of the kennel. The wheels may include a shaft that is connected to the base or floor of the kennel. Each wheel may be individually connected to the base (e.g., floor) of the kennel so that each wheel may operate independently.

The base functions to be a floor of the kennel. The base functions to be a part of the kennel that supports the animal or animals. The base may be a raised floor. The base may hold bowls, a bathroom system, an animal, or a combination thereof. All or a portion of the base may be solid. All or a portion of the base may include apertures, be porous, or both. The base may have some portion that is solid and some portion that includes holes or apertures. The base may be made of or include metal, steel, stainless steel, carbon steel, plastic, a polymer, delrin, a polycarbonate (PC), a polyester, polyethylene terephthalate (PET or PETE), polyethylene (PE), polyvinyl chloride (PVC), polypropylene (PP), polystyrene (PS), acrylic (polymethyl methacrylate (PMMA)), polyoxymethylene (Acetal (POM)), nylon, acrylonitrile butadiene styrene (ABS), or a combination thereof. The base may be a metal that is over molded. The base may be planar. The base may be recessed or include recesses. The base may include bowls built into the base. The base may be sloped to one side. The base may be flat. The base may be adjustable to adjust a slope of the base. The base may made of a same or different material as the side walls (e.g., first side wall, second side wall).

The side walls function to create a vertical barrier, support one or more modular parts, connect one or more kennels together, support a roof, connect a roof to a base, or a combination thereof. The side walls may connect together to form an enclosure. The side walls may be three or more side walls, four or more side walls, five or more side walls, six or more side walls, or ten or less side walls. The side walls may connect together to form a geometric shape, a non-geometric shape, a square, a rectangle, pentagon, hexagon, heptagon, octagon, or a combination thereof. The side walls may extend between the base and roof to support the roof. The side walls may have a first side wall and a second side wall. The side walls may support one or more modular parts. The side walls may be located under a roof.

The roof functions to create an upper surface, prevent rain from entering a kennel, to allow light to enter the kennel, or a combination thereof. The roof may include one or more windows. The roof may be free of windows. All or a portion of the roof may be transparent. If the roof is transparent the roof may include a photochromic dye. The roof may support all or a portion of a cleaning system, a connection system, a sanitizing system, a communication system, or a combination thereof. The roof may be flat. The roof may be pitched. The roof may have a peak and then may slope away from the peak. The roof may have a peak in the center and then slope away from the peak in two or more directions. The roof may be solid. The roof may be fluid impermeable. The roof may include or be located proximate to a connection system.

The connection system function to connect two or more kennels together, connect a kennel and one or more modular parts, or both. The connection system may be a mechanical system that connects two parts of the kennel together. The connection system may be magnetic. The connection system may include screws, nuts, bolts, threaded fasteners, hooks, hangers, or a combination thereof. The connection system may include a U bolt and a fastener that extends between and connects to both ends of the U bolt and then is secured in place by nuts. The connection system may be a bungee. The connection system may be a male part that extends from one kennel to a female part on a modular part or another kennel. The connection system may be a hook that extends from one kennel or module part into contact with an eyelet or a male part to form a connection. The connection system may be two mating parts. The connection system may include one mating part that slides over another mating part. Mating parts may be one or more connectors.

The connector function two connect two parts together, to connect two kennels together, to connect a modular part to a kennel, or a combination thereof. A first connector may be located on a first part and a second connector may be located on a second part. One connector may be a male piece and one connector may be a female piece. One connector may extend from the kennel or modular part into contact with another connector. One connector may rotatably move. One connector may be static. The connectors may include magnets. The connectors may be a threaded fastener. The connectors may be an aperture. The connectors may be a peg that hook extends around or over. The connectors may be hook. The connectors may be detached. The connectors may support a modular part.

The modular parts may function to provide additional functionality or devices to a kennel. The modular parts may be added or removable from the kennel. The modular parts may be added separately to the kennel. The modular parts may include a feeding system, a sanitizing system, a communication system, a bathroom system, an entry system, a cleaning system, a movement sensor, a connection system, or a combination thereof. The modular parts may be in communication with the remote device, the app, or both. The modular parts may connect to the roof, a side wall, the base, or some combination thereof.

FIG. 1 illustrates a perspective view of a kennel 2 in an assembled state 112. The kennel 2 includes a feeding system 9, sanitizing system 30, communication system 50, bathroom system 60, and entry system 80. The feeding system 9 includes a water bowl 10 in communication with water storage 12 that continuously or intermittently refills the water bowl 10 and a food bowl 16 in communication with a food storage 18 that continuously or intermittently refills the food bowl 16. A sanitizing system 30 is in communication with the water bowl 10 and the food bowl 16 so that the water bowl 10 and food bowl 16 are sanitized on command or at a pre-determined time. A fan 44 is located in a wall and is activated by a temperature sensor 46 or a remote device (not shown) when a predetermined temperature is measured. A communication system 50 is located, as shown, proximate to a roof and the communication system 50 may include a camera, speaker, and microphone. The kennel 2 includes a bathroom system 60, which includes a tray 62 and storage 64 so that when an animal uses the tray 62 the waste is collected. The sanitizing system 30 can also be activated to sanitize the bathroom system 60. The tray 62 of the bathroom system 60, as shown, is stored, and is movable downward when ready for use. An entry system 80 is located at a forward end to assist an animal in entering and exiting the kennel 2. The entry system 80 includes stairs 82 having a cleaning system 84. The cleaning system 84 as shown is a plurality of recessed bristles or brushes 86 that remove and collect items from paws of an animal so that debris, dirt, food, or the like are prevented from being tracked around a house (not shown). An open button 88 is located in the entrance and includes a biometric sensor 90 that recognizes a paw or a face of an animal so that the movable door 92 in only activated for a specific animal. The kennel 2 includes a window 94 that permits light to enter. The kennel 2 has a movement sensor 100 that monitors the kennel 2 for movement or disturbances.

Figure 2:
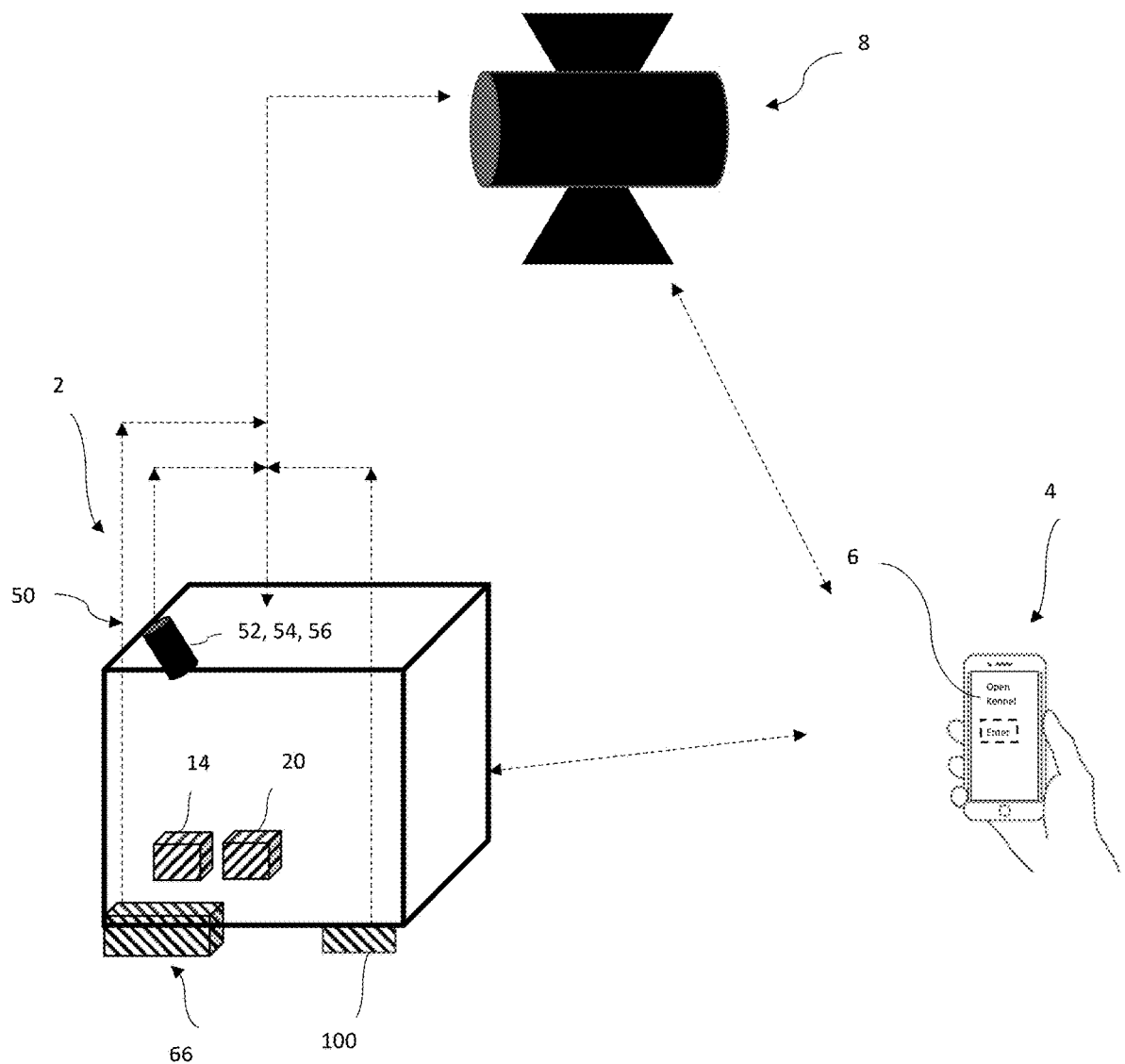
FIG. 2 illustrates a kennel being remotely controlled.

FIG. 2 is schematic of the kennel 2 in direct communication with a remote device 4 or in communication with the remote device 4 via an application 6 and a transmitter 8. The kennel 2 has a water sensor 14 and food sensor 20 that monitor an amount of food and water within the bowls or being consumed. The communication system 50 includes a camera 52, speaker 54, and microphone 56 that allow an owner to communicate with the animal through the remote device 4 or the application 6 on the remote device 4. The kennel 2 includes a bathroom sensor 66 that provides an alert when the storage reaches a predetermined level. A movement sensor 100 continuously monitors the kennel 2 and alerts the remote device 4 if a predetermined condition is met such as rolling of the kennel, sustained noise from the animal, or lack of movement by the animal for a predetermined amount of time.

Figure 3:
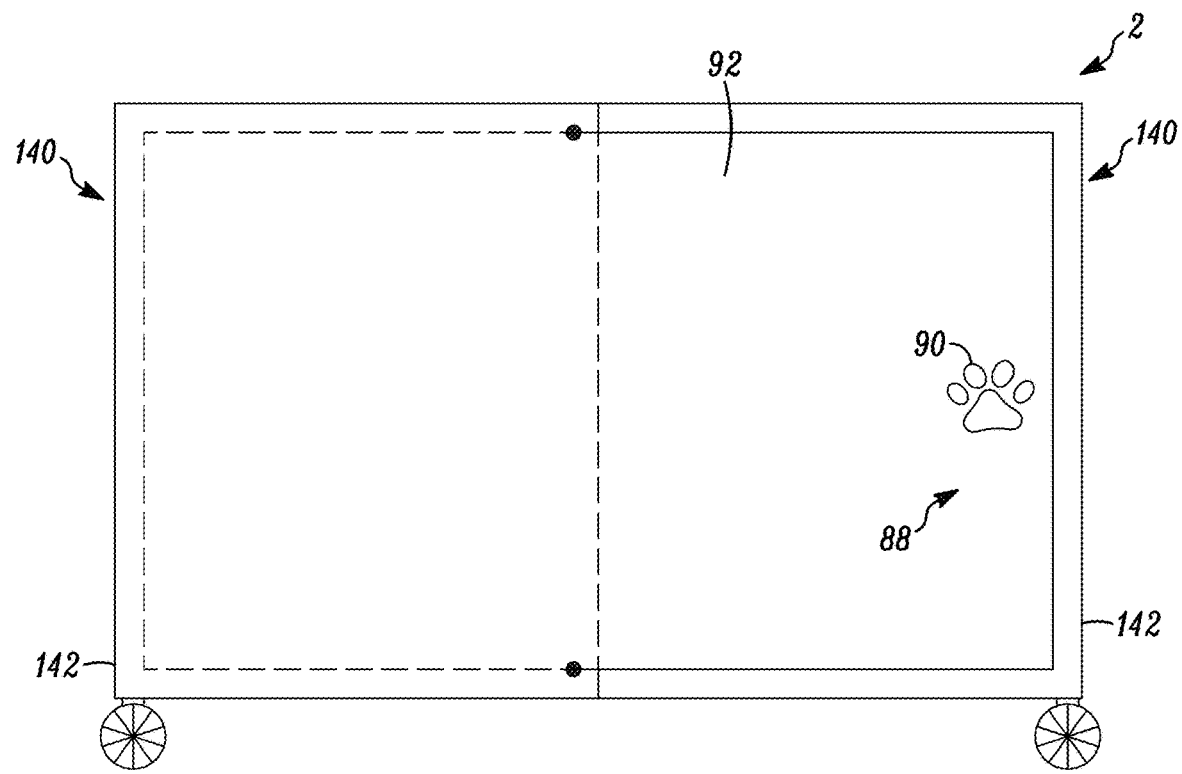
FIG. 3 is a front view of the kennel in a closed configuration.

FIG. 3 is a front view of the kennel 2 with the door 92 closed. The door 92 includes an open button 88 that includes a biometric sensor 90. Each side of the kennel 2 includes a connection system 140 and a connector 142 that may connect one or more kennels together or one or more other modular parts together.

Figure 4:
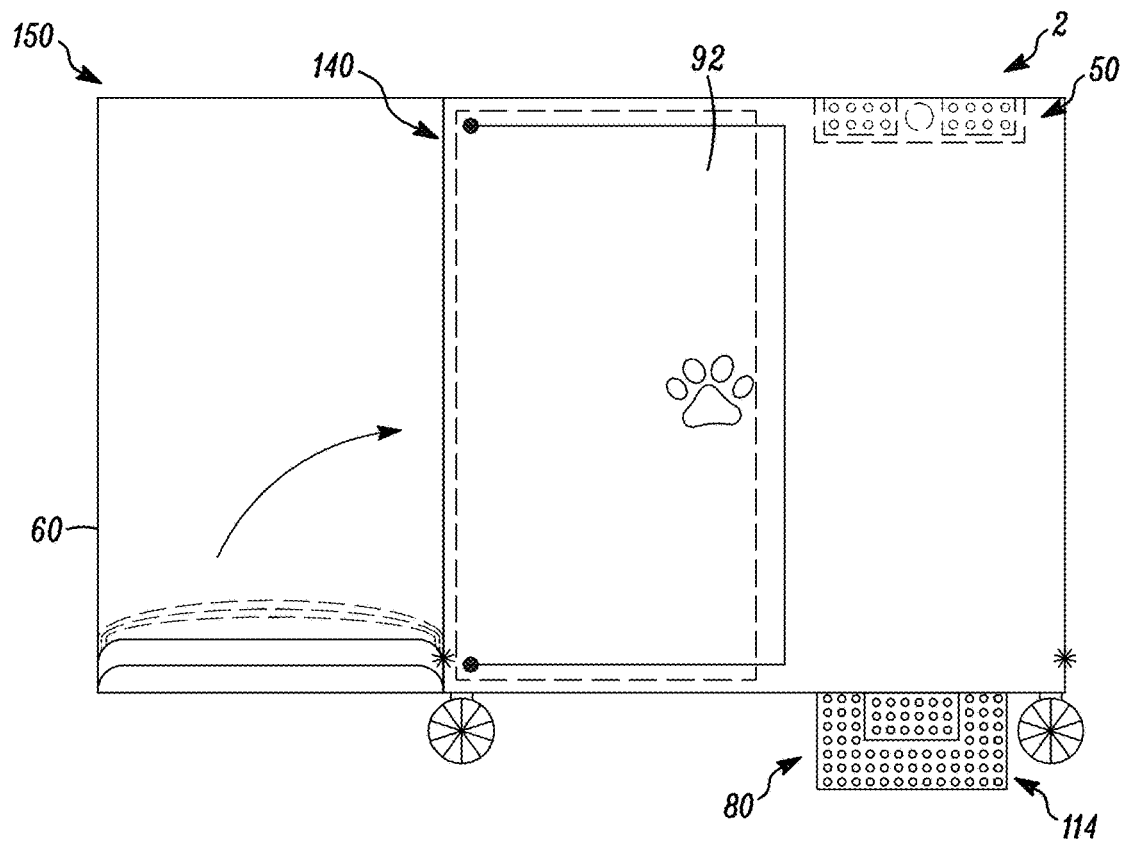
FIG. 4 is a front view of the kennel in an open configuration.

FIG. 4 illustrates the kennel 2 with a modular part 150 connected to the kennel 2 via the connection system 140. The modular part 150 is a bathroom system 60 that folds down and extends the kennel 2 so that an animal housed within the kennel 2 has a place to use the bathroom outside of the main kennel area. The door 92 is shown in the open position with the entry system 80 in an unfolded state 114. A communication system 50 is visible through the open door 92 that monitors an interior of the kennel 2.

Figure 5:
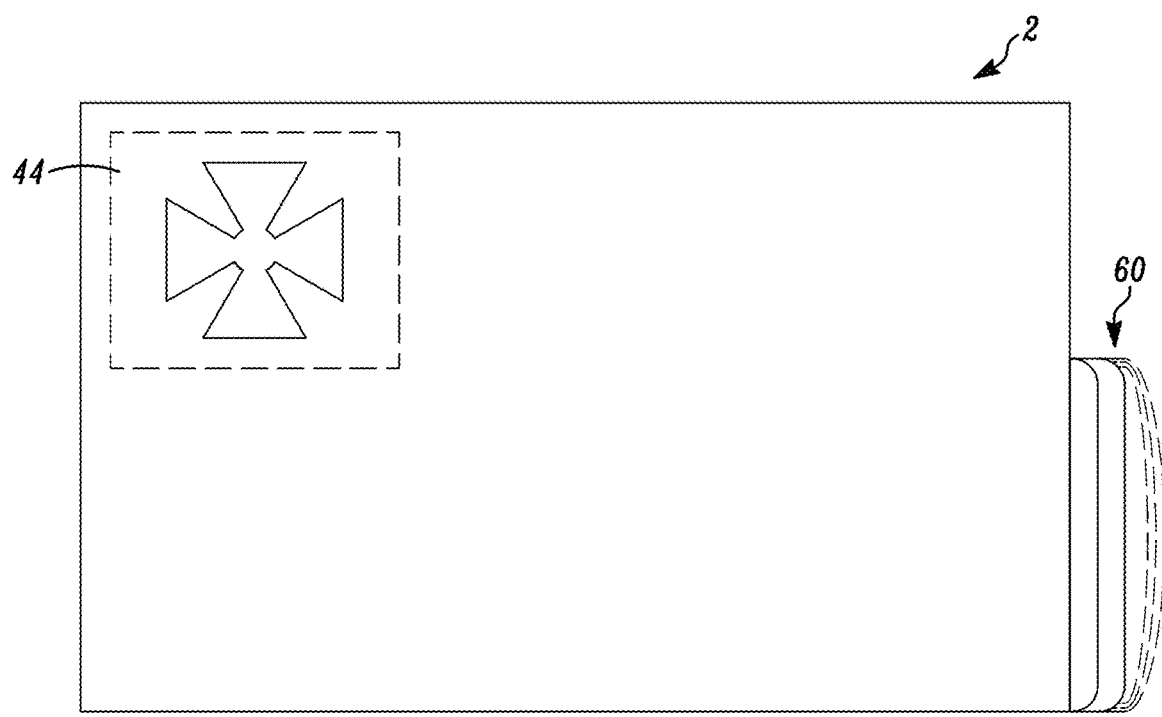
FIG. 5 is a side view of the kennel in a closed configuration.

FIG. 5 is a side view of the kennel 2 with bathroom system 60 located and stored within a side wall opposite a fan 44.

Figure 6:
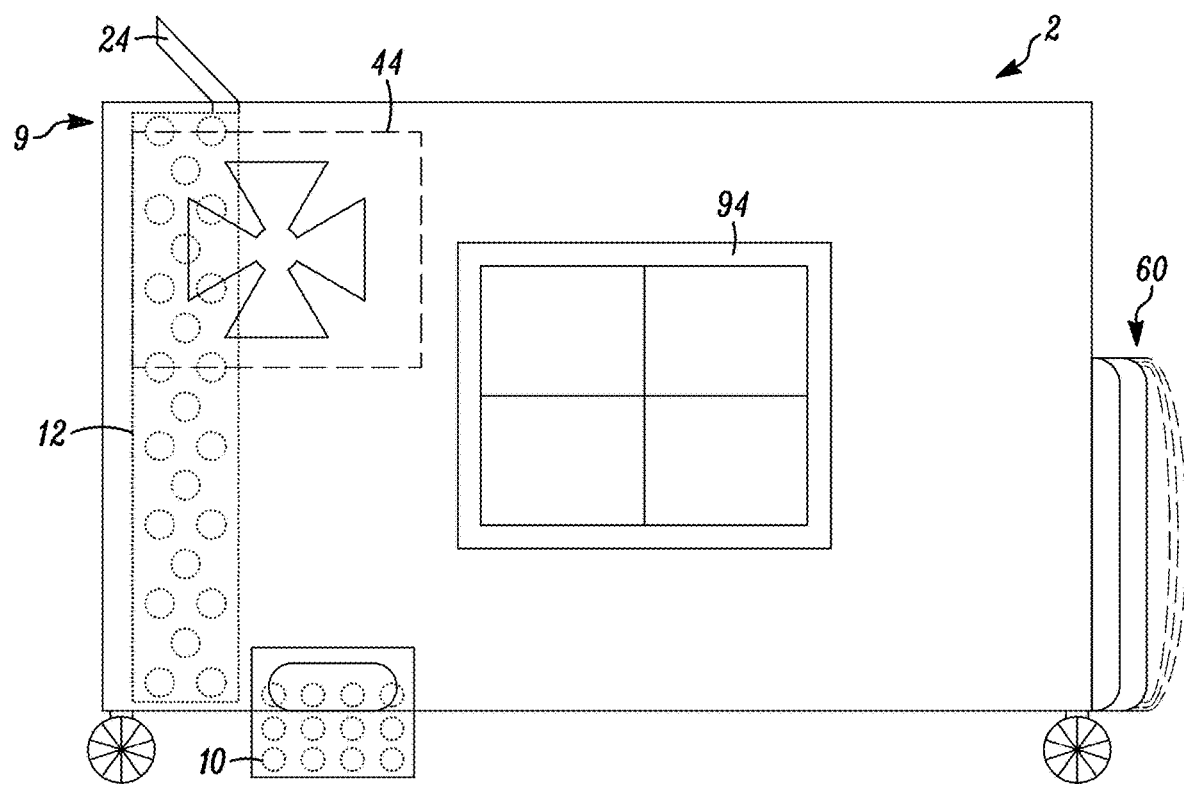
FIG. 6 is a side view of the kennel in an open configuration.

FIG. 6 is a side view of the kennel 2 showing the bathroom system 60 in a stored state with a window 94 located between the bathroom system 60 and a fan 44. A feeding system 9 is located along one end of the side wall with a water bowl 10 located below a water storage 12, which includes a refill flap 24 (similarly the food storage (not shown) includes a refill flap).

Figure 7:
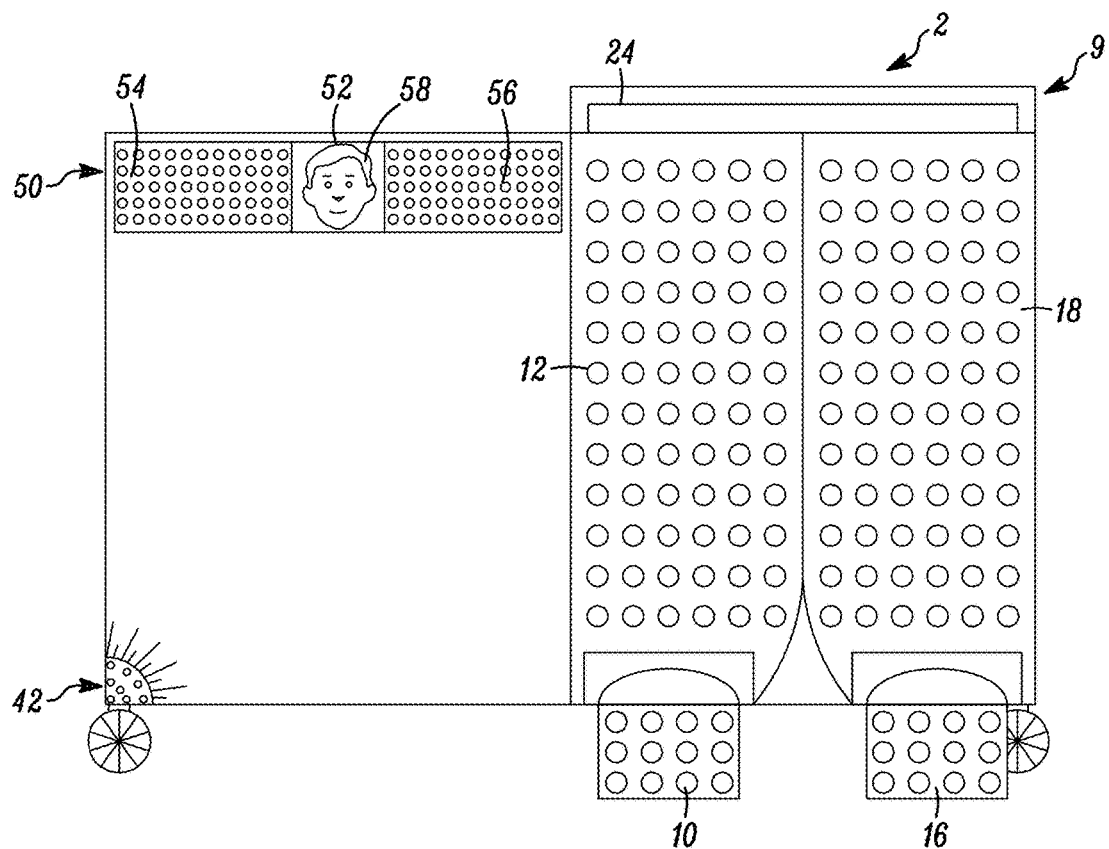
FIG. 7 is a rear view of the kennel.

FIG. 7 illustrates a rear side of the kennel 2. A feeding system 9 is located on one side of the rear wall. The feeding system 9 includes a water bowl 10 located below a water storage 12 and a refill flap 24 and a food bowl 16 located under a food storage 18 and a refill flap 24. A light 42 is located on an opposite side of the rear wall as the feeding system 9. The kennel 2 also includes a communication system 50 including a camera 52, speaker 54, microphone 56, and screen 58.

Figure 8:
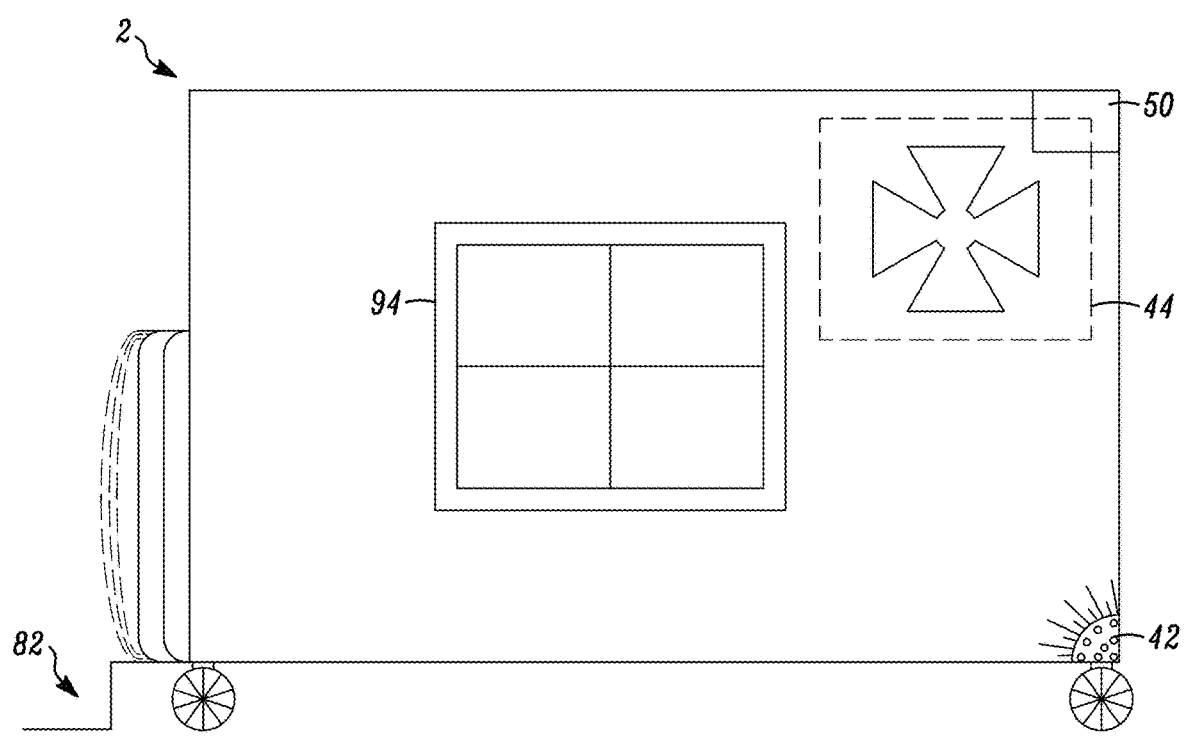
FIG. 8 is a side view of the kennel.

FIG. 8 is a side view of the kennel 2 with the communication system 50 extending along a top wall behind a fan 44. A light 42 is located below the communication system 50. A window 94 is located between the fan and the stairs 82 of the kennel 2.

FIG. 9A is a top view of a spill preventor 22 around the water bowl 10 and the food bowl 16. The spill preventor 22 includes holes the collect fluids, crumbs, or uneaten food that are splashed out of the water bowl 10 or the food bowl 16 so that the cage remains dry and clean for the animal.

FIG. 9B is a cross-sectional view of a spill preventor 22 that creates an angled recess that redirects the water back into the water bowl 10. Similarly, a spill preventor for food would redirect crumbs or uneaten food back into the food bowl (not shown).

FIG. 9C is a plan view of a sanitizing system 30. The sanitizing system 30 includes a heater 32 that directs heated fluid or steam through a supply line 34 to nozzles 36 wherein the heated fluid or steam are directed to the spill preventor 22 and water bowl 10 and/or food bowl 16 to clean and/or sanitize.

Figure 10:
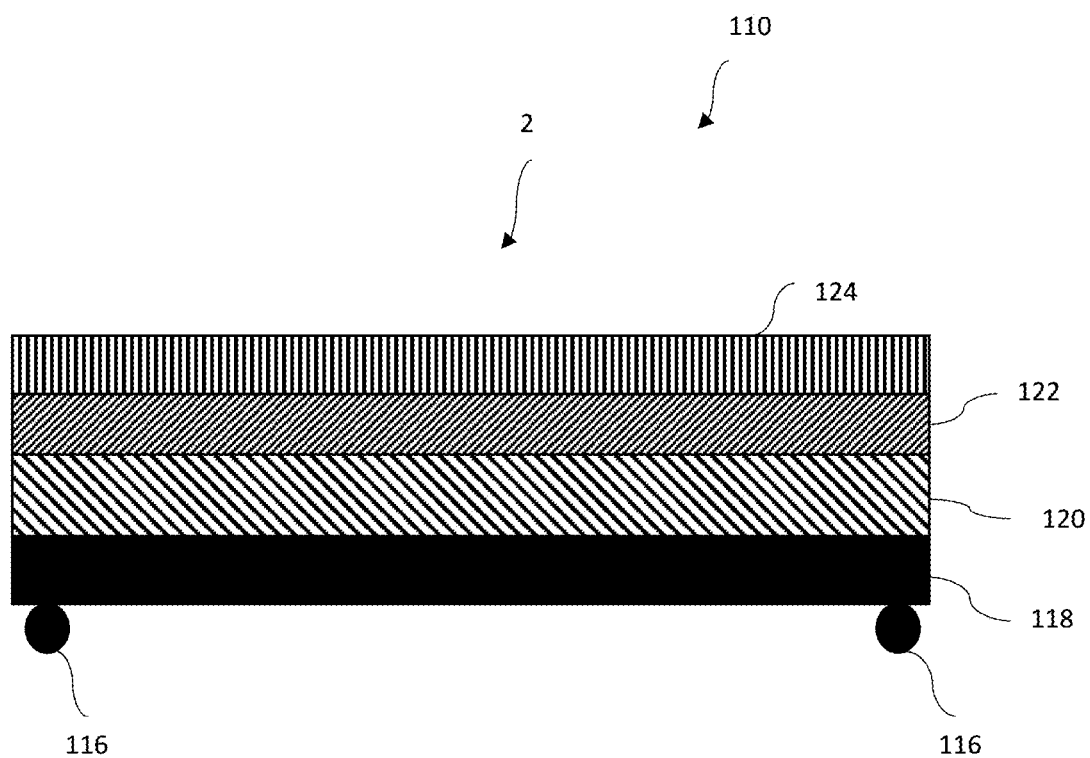
FIG. 10 is a side view of the kennel in a packaged state.

FIG. 10 illustrates the kennel 2 in a packaged state 110. In the packaged state 110 the wheels 116 support a base 118, the first side wall 120, the second side wall 122, and the roof 124. The front wall and the rear wall are not visible as they are folded into the first side wall 120 and/or second side wall 122.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

Variation 1 may comprise: a kennel comprising: (a) a feeding system including: (i) one or more water bowls; (ii) one or more water storage in communication with the one or more water bowls; (iii) one or more food bowls; and (iv) one or more food storage in communication with the one or more food bowls; (b) a communication system including: (i) one or more cameras; (ii) one or more speakers; (iii) one or more microphones; or (iv) a combination of (i), (ii), and (iii); (c) an entry system including: a cleaning system; and (d) a remote device including an application that is in communication with the kennel so that a user can control the feeding system, the communication system, the entry system, or a combination thereof.

Variation 2 may comprise variation 1 and may comprise a bathroom system.

Variation 3 may comprise any of variations 1-2 and may comprise wherein the bathroom system is movable between a stored position and a deployed position.

Variation 4 may comprise any of variations 1-3 and may comprise wherein the bathroom system includes a tray that an animal uses to go to the bathroom and a storage for storing liquids, solids, or both.

Variation 5 may comprise any of variations 1-4 and may comprise wherein the storage includes a bathroom sensor that monitors a level within the storage.

Variation 6 may comprise any of variations 1-5 and may comprise wherein the bathroom sensor is in communication with the application.

Variation 7 may comprise any of variations 1-6 and may comprise a sanitizing system that cleans, sanitizes, or both the one or more water bowls, the one or more food bowls, a bathroom system, or combination thereof.

Variation 8 may comprise any of variations 1-7 and may comprise wherein the sanitizing system includes a heater that heats a fluid to sanitize.

Variation 9 may comprise any of variations 1-8 and may comprise wherein the sanitizing system includes nozzles that distribute steam.

Variation 10 may comprise any of variations 1-9 and may comprise wherein the sanitizing system is in communication with the application so that a user can remotely sanitize.

Variation 11 may comprise any of variations 1-10 and may comprise a connection system.

Variation 12 may comprise any of variations 1-11 and may comprise wherein the connection system includes one or more connectors that connect the kennel to one or more other kennels or one or more modular parts.

Variation 13 may comprise any of variations 1-12 and may comprise wherein the one or more modular parts are a bathroom system, a sanitizing system, the entry system, the communication system, the feeding system, or a combination thereof.

Variation 14 may comprise any of variations 1-13 and may comprise a spill preventor that houses the one or more food bowls, the one or more water bowls, or both.

Variation 15 may comprise any of variations 1-14 and may comprise wherein the spill preventor includes holes that catch water, food, crumbs, or a combination thereof.

Variation 16 may comprise any of variations 1-15 and may comprise walls of the spill preventor are angled so that food water, crumbs, or a combination thereof are redirected into the one or more water bowls, the one or more food bowls, or both respectively.

Variation 17 may comprise any of variations 1-6 and may comprise a fan in a wall of kennel.

Variation 18 may comprise any of variations 1-17 and may comprise a transparent window, a transparent door, or both and the transparent window, the transparent door, or both include a photochromic dye and adjust in tint when exposed to sunlight.

Variation 19 may comprise any of variations 1-18 and may comprise wherein the entry system comprises a ramp or steps and the ramp or steps a recess that holds the cleaning system.

Variation 20 may comprise any of variations 1-19 and may comprise an open button having one or more biometric sensors that only permit entry of an animal keyed to the one or more biometric sensors.

ELEMENT LIST

2 Kennel
4 Remote Device
6 Application
8 Transmitter

9 Feeding System
10 Water Bowl
12 Water Storage
14 Water Sensor
16 Food Bowl
18 Food Storage
20 Food Sensor
22 Spill Preventor
24 Refill Flap
30 Sanitizing System
32 Heater
34 Supply Line
36 Nozzles
40 Light Sensor
42 Light
44 Fan
46 Temperature Sensor
50 Communication System
52 Camera
54 Speaker
56 Microphone
58 Screen
60 Bathroom System
62 Tray
64 Storage
66 Bathroom Sensor
80 Entry System
82 Stairs
84 Cleaning System
86 Brushes
88 Open Button
90 Biometric Sensor
92 Door
94 Window
100 Movement Sensor
110 Packaged State
112 Assembled State
114 Unfolded State
116 Wheel
118 Base
120 First Side Wall
122 Second Side Wall
124 Roof
140 Connection System
142 Connector
150 Modular Part

I claim:

1. A kennel comprising:
a) a feeding system including:
  i) one or more water bowls;
  ii) one or more water storage in communication with the one or more water bowls;
  iii) one or more food bowls;
  iv) one or more food storage in communication with the one or more food bowls; and
  v) a spill preventor forming a portion of the floor that extends around and houses the one or more food bowls and the one or more water bowls, wherein the spill preventor includes holes that are located around the one or more food bowls and the one or more water bowls so that any water, food, crumbs, or a combination thereof dropped are collected, and wherein the one or more water bowls and the one or more food bowls are recessed into the spill preventer;
b) a communication system including:
  i) one or more cameras;
  ii) one or more speakers; and
  iii) one or more microphones;
c) an entry system including: a cleaning system;
d) a sanitizing system;
e) a remote device including an application that is in communication with the kennel so that a user can control the feeding system, the communication system, the entry system, or a combination thereof; and
f) a bathroom system;
wherein the spill preventor, the one or more food bowls, the one or more water bowls, or a combination thereof are connected to the sanitizing system, the bathroom system, or both so that water or food is collected and stored in the sanitizing system, the bathroom system or both so that the water or food is disposable.

2. The kennel of claim 1, wherein the bathroom system includes a tray that an animal uses to go to the bathroom and a storage for storing liquids, solids, or both.

3. The kennel of claim 2, wherein the storage includes a bathroom sensor that monitors a level within the storage.

4. The kennel of claim 3, wherein the bathroom sensor is in communication with the application.

5. The kennel of claim 1, wherein the sanitizing system cleans, sanitizes, or both the one or more water bowls, the one or more food bowls, a bathroom system, or combination thereof.

6. The kennel of claim 5, wherein the sanitizing system includes a heater that heats a fluid to sanitize.

7. The kennel of claim 6, wherein the sanitizing system includes nozzles that distribute steam generated by the heater.

8. The kennel of claim 5, wherein the sanitizing system is in communication with the application so that a user can remotely sanitize.

9. The kennel of claim 1, comprising a connection system that includes one or more connectors that connect the kennel to one or more other kennels or one or more modular parts.

10. The kennel of claim 9, wherein the one or more modular parts are a bathroom system, a sanitizing system, the entry system, the communication system, the feeding system, or a combination thereof.

11. The kennel of claim 1, wherein walls of the spill preventor are angled so that food water, crumbs, or a combination thereof are redirected into the one or more water bowls, the one or more food bowls, or both respectively.

12. The kennel of claim 1, comprising a fan in a wall of kennel and a temperature sensor configured to turn the fan on or off based upon a temperature inside of the kennel, outside of the kennel, or both.

13. The kennel of claim 1, comprising a transparent window, a transparent door, or both and the transparent window, the transparent door, or both include a photochromic dye and adjust in tint when exposed to sunlight.

14. The kennel of claim 1, wherein the entry system comprises a ramp or steps and the ramp or the steps comprise a recess that holds the cleaning system.

15. The kennel of claim 1, comprising an open button having one or more biometric sensors that only permit entry of an animal keyed to the one or more biometric sensors.

16. The kennel of claim 1, wherein the bathroom system is movable between a folded state and an unfolded state, wherein the bathroom system in the folded state is substantially vertical relative to a base of the kennel.

17. The kennel of claim 1, further comprising a movement sensor that monitors the kennel and alerts the remote device if a predetermined condition is met.

18. The kennel of claim 1, wherein the one or more water bowls and the one or more food bowls include a hinge that is movable to allow contents of the one or more water bowls to be moved into the one or more water storage or the bathroom system and the one or more food bowls to move food into the one or more food storage or the bathroom system.

19. The kennel of claim 5, wherein a hinge of the one or more water bowls and a hinge of the one or more food bowls is openable so that as the sanitizing system cleans, sanitizes, or both the one or more water bowls and the one or more food bowls the food, the water, a cleaning solution, cleaning fluids, or a combination thereof extend into the bathroom system.

20. The kennel of claim 19, wherein the hinge is located on a bottom of the one or more food bowls and a bottom of the one or more water bowls so that contents of the one or more food bowls and the one or more water bowls are emptied into a storage of the bathroom system.

* * * * *